(12) United States Patent
Spiro et al.

(10) Patent No.: US 11,392,447 B2
(45) Date of Patent: *Jul. 19, 2022

(54) FAULT CLUSTERING FOR REMEDIAL ACTION ANALYSIS

(71) Applicant: Palantir Technologies Inc., Denver, CO (US)

(72) Inventors: Ezra Spiro, New York, NY (US); Zachary Imholte, Cincinnati, OH (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/073,720

(22) Filed: Oct. 19, 2020

(65) Prior Publication Data

US 2021/0034454 A1     Feb. 4, 2021

Related U.S. Application Data

(63) Continuation of application No. 16/115,081, filed on Aug. 28, 2018, now Pat. No. 10,810,076.

(51) Int. Cl.
*G06F 11/07* (2006.01)
*G06K 9/62* (2022.01)
*G06F 3/04842* (2022.01)

(52) U.S. Cl.
CPC ...... *G06F 11/0793* (2013.01); *G06F 3/04842* (2013.01); *G06F 11/079* (2013.01); *G06F 11/0769* (2013.01); *G06K 9/6218* (2013.01)

(58) Field of Classification Search
CPC ............ G06F 11/0793; G06F 11/0769; G06F 11/079; G06F 3/04842; G06K 9/6218
See application file for complete search history.

(56) References Cited

U.S. PATENT DOCUMENTS

| | | | |
|---|---|---|---|
| 7,043,403 B1 * | 5/2006 | Wang | G05B 23/024 702/182 |
| 7,069,473 B2 | 6/2006 | Yasuda | |
| 9,582,781 B1 * | 2/2017 | Kearns | G06F 16/355 |
| 9,705,817 B2 | 7/2017 | Lui et al. | |

(Continued)

OTHER PUBLICATIONS

U.S. Appl. No. 15/634,549, Palantir Technologies Inc. (Year: 2017).

(Continued)

*Primary Examiner* — Jonathan D Gibson
(74) *Attorney, Agent, or Firm* — Sheppard Mullin Richter & Hampton LLP (57) ABSTRACT

Systems, methods, and non-transitory computer readable media are provided for facilitating improved analysis of remedial actions for faults. Fault information may be obtained. The fault information may characterize a fault of a device. The fault may be clustered into a fault type based on the fault information. A set of remedial actions taken for the fault type may be identified. A set of remedial effects of the set of remedial actions for the fault type may be determined. A timeline view of the fault type may be generated based on the set of remedial actions and the set of remedial effects. The timeline view may include a visual representation of effectiveness of the set of remedial actions. An interface, through which the timeline view of the fault type is accessible, may be provided.

15 Claims, 6 Drawing Sheets

(56) References Cited

U.S. PATENT DOCUMENTS

| | | | |
|---|---|---|---|
| 2003/0070114 A1* | 4/2003 | Yasuda | G06F 11/0793 714/20 |
| 2005/0050210 A1 | 3/2005 | Kennedy | |
| 2005/0081410 A1 | 4/2005 | Furem et al. | |
| 2006/0082763 A1 | 4/2006 | Teh et al. | |
| 2006/0271526 A1 | 11/2006 | Charnock et al. | |
| 2007/0288219 A1 | 12/2007 | Zafar et al. | |
| 2010/0131450 A1 | 5/2010 | Nguyen et al. | |
| 2010/0174691 A1 | 7/2010 | Caldwell et al. | |
| 2011/0231169 A1 | 9/2011 | Furem et al. | |
| 2011/0288660 A1 | 11/2011 | Wojsznis et al. | |
| 2012/0246623 A1 | 9/2012 | Creel | |
| 2012/0317058 A1 | 12/2012 | Abhulimen | |
| 2013/0080641 A1 | 3/2013 | Lui et al. | |
| 2014/0245061 A1* | 8/2014 | Kobayashi | G06F 11/0706 714/6.11 |
| 2014/0324862 A1 | 10/2014 | Bingham et al. | |
| 2014/0331277 A1* | 11/2014 | Frascadore | H04L 63/104 726/1 |
| 2016/0350671 A1 | 12/2016 | Morris, II et al. | |
| 2017/0083390 A1* | 3/2017 | Talwadker | G06F 11/0748 |
| 2017/0132724 A1 | 5/2017 | Aqlan et al. | |
| 2018/0173216 A1 | 6/2018 | Spiro et al. | |
| 2018/0173217 A1 | 6/2018 | Spiro et al. | |
| 2019/0179691 A1* | 6/2019 | Xu | G06F 11/079 |
| 2020/0034211 A1* | 1/2020 | Kumar P | G06K 9/6223 |
| 2021/0026722 A1* | 1/2021 | Bhatia | G06N 20/00 |
| 2021/0109843 A1* | 4/2021 | Datta | G06F 17/15 |

OTHER PUBLICATIONS

Official Communication for U.S. Appl. No. 15/839,743 dated Nov. 1, 2018.
Official Communication for U.S. Appl. No. 15/839,743 dated Apr. 6, 2018.
Official Communication for U.S. Appl. No. 15/448,155 dated Jun. 11, 2018.
Official Communication for U.S. Appl. No. 15/838,122 dated Sep. 21, 2018.
Official Communication for U.S. Appl. No. 15/448,155 dated Sep. 14, 2017.
Official Communication for U.S. Appl. No. 15/448,155 dated May 19, 2017.

* cited by examiner

FAULT CLUSTERING FOR REMEDIAL ACTION ANALYSIS

CROSS-REFERENCE TO RELATED APPLICATION

This application is a continuation of U.S. application Ser. No. 16/115,081 filed Aug. 28, 2018.

FIELD OF THE INVENTION

This disclosure relates to approaches for providing improved analysis of remedial actions for faults.

BACKGROUND

Under conventional approaches, a user may code faults for a device using predefined classifications. Such classifications may be numerous, which may make proper classification of faults difficult, time consuming, and/or computationally intensive. Furthermore, errors in coding of faults may result in misclassification of faults, inaccurate analysis of potential remedial actions, and/or less efficient utilization of computing resources.

SUMMARY

Various embodiments of the present disclosure may include systems, methods, and non-transitory computer readable media configured to provide improved analysis of remedial actions for faults. Fault information may be obtained. The fault information may characterize a fault of a device. The fault may be clustered into a fault type based on the fault information. A set of remedial actions taken for the fault type may be identified. A set of remedial effects of the set of remedial actions for the fault type may be determined. A timeline view of the fault type may be generated based on the set of remedial actions and the set of remedial effects. The timeline view may include a visual representation of effectiveness of the set of remedial actions. An interface, through which the timeline view of the fault type is accessible, may be provided.

In some embodiments, the fault information may include description of the fault. The description of the fault may include free-form textual description of the fault.

In some embodiments, the timeline view of the fault type may include a first set of visual elements and a second set of visual elements. The first set of visual elements may represent occurrences of one or more faults of the fault type. The second set of visual elements may represent the set of remedial actions taken for the fault(s) of the fault type.

In some embodiments, the second set of visual elements may change based on the effectiveness of the set of remedial actions. The effectiveness of the set of remedial actions may be determined based on the set of remedial effects. The set of remedial effects may include a temporary fix effect and a final fix effect.

In some embodiments, the first set of visual elements and the second set of visual elements may be interactive such that: responsive to user interaction with a visual element of the first set of visual elements, information on a corresponding fault is presented; and responsive to user interaction with a visual element of the second set of visual elements, information on a corresponding remedial action is presented. Presentation of the information on the corresponding fault or the corresponding remedial action may include a preview of a view of the information within an external application.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

A claimed solution rooted in computer technology overcomes problems specifically arising in the realm of computer technology. In various implementations, a computing system is configured to obtain fault information. The fault information may characterize a fault of a device. The fault may be clustered into a fault type based on the fault information. A set of remedial actions taken for the fault type may be identified. A set of remedial effects of the set of remedial actions for the fault type may be determined. A timeline view of the fault type may be generated based on the set of remedial actions and the set of remedial effects. The timeline view may include a visual representation of effectiveness of the set of remedial actions. The timeline view may facilitate analysis of history of faults/fault types and remedial actions taken for the faults/fault types. The timeline view may provide classification of faults, fault types, and/or remedial actions taken for the faults/fault types. The timeline view may provide information on frequency of faults, fault type, and/or remedial actions. The timeline view may provide information on success rate and/or effective duration of remedial actions. An interface through which the timeline view of the fault type is accessible may be provided. The interface may enable filtering of information displayed within the timeline view.

In some embodiments, the fault information may include a description of the fault. The description of the fault may include a free-form textual description of the fault, such as a free-form textual description entered by a technician. The fault may be clustered into the fault type based on the free-form textual description.

In some embodiments, the timeline view of the fault type may include a first set of visual elements representing occurrences of one or more faults of the fault type and a second set of visual elements representing the set of remedial actions taken for the one or more faults of the fault type. The second set of visual elements may change based on the effectiveness of the set of remedial actions. The effectiveness of the set of remedial actions may be determined based on the set of remedial effects. The set of remedial effects may include a temporary fix effect and a final fix effect.

In some embodiments, the first set of visual elements and the second set of visual elements may be interactive. Responsive to user interaction with a visual element of the first set of visual elements, information on a corresponding fault may be presented. Responsive to user interaction with a visual element of the second set of visual elements, information on a corresponding remedial action may be presented.

In some embodiments, presentation of the information on the corresponding fault or the corresponding remedial action may include a preview of a view of the information within an external application. The information on the corresponding fault or the corresponding remedial action may include one or more links to records for the fault or the remedial action.

The approaches disclosed herein may facilitate improved analysis and selection of remedial actions to be taken for faults of devices. By clustering faults into fault types, analyzing prior remedial actions taken for a fault type, and determining effectiveness of the remedial actions, a timeline view of the fault type may be generated. The timeline view of the fault type may include visual representation of the effectiveness of different remedial actions previously taken for the fault type. The timeline view of the fault type may allow a user to analyze history of faults/fault type and remedial actions taken for the faults/fault type. That is, the timeline view of the fault type may enable a user to analyze prior instances in which the faults of the fault type occurred and prior remedial actions taken for the faults of the fault type. The timeline view of the fault type may provide a comprehensive view of the prior remedial actions and facilitate a user's selection of remedial actions to address faults of the fault type.

Figure 1:
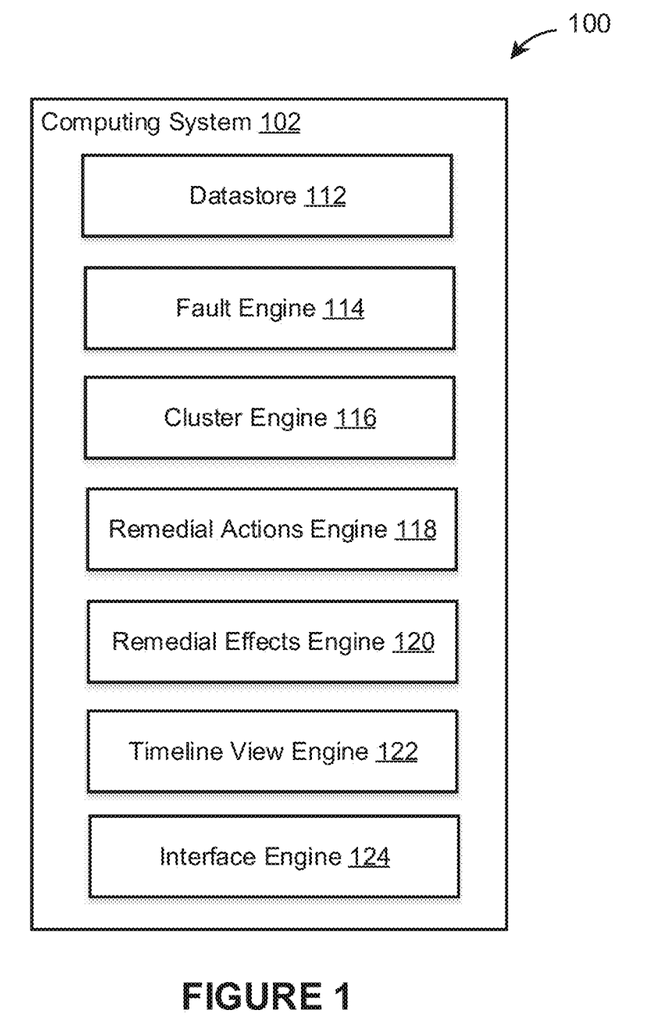
FIG. 1 illustrates an example environment for providing improved analysis of remedial actions for faults, in accordance with various embodiments.

FIG. 1 illustrates an example environment 100 for providing improved analysis of remedial actions for faults, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores (not shown) that is accessible to the computing system 102 (e.g., via one or more network(s)). In some embodiments, the datastore(s) may include various databases, application functionalities, application/data packages, and/or other data that are available for download, installation, and/or execution.

In various embodiments, the computing system 102 may include a datastore 112, a fault engine 114, a cluster engine 116, a remedial actions engine 118, a remedial effects engine 120, a timeline view engine 122, an interface engine 124, other engines, and/or other components. The datastore 112 may include structured and/or unstructured sets of data that can be divided/extracted for provision when needed by one or more components of the environment 100. The datastore 112 may include one or more datasets of information. The datastore 112 may include one or more databases. The datastore 112 may include different data analysis modules that facilitate different data analysis tasks, patches for the applications/systems, custom application/functionalities built for particular application/systems, and/or other information to be used in the environment 100. While the computing system 102 is shown in FIG. 1 as a single entity, this is merely for ease of reference and is not meant to be limiting. One or more components/functionalities of the computing system 100 described herein may be implemented in a single computing device or multiple computing devices.

In various embodiments, the fault engine 114 may be configured to obtain fault information. Obtaining fault information may include accessing, acquiring, analyzing, determining, examining, identifying, loading, locating, opening, receiving, retrieving, reviewing, storing, and/or otherwise obtaining the fault information. For example, the fault engine 114 may search for and/or retrieve fault information for one or more particular devices or one or more particular portions, features, and/or aspects of devices. Fault information may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). Fault information may be obtained from one or more databases (e.g., stored within the datastore 112). Fault information may be stored within a single file or across multiple files. For example, fault information for a device may have been ingested into a database as one or more objects, and the fault engine 114 may retrieve the object(s) to obtain the fault information.

Fault information may characterize a fault of a device. A device may refer to a thing manufactured or adapted for one or more purposes or functions. A device may include one or more pieces of equipment and/or mechanisms designed to serve one or more purposes or functions. A device may include one or more software components and/or one or more hardware components. A device may be undergoing development, may be being manufactured, may be being produced, and/or may be being used. For example, fault information may identify a fault of software or hardware of a device in development or a device in production. A fault may refer to a defect, a shortcoming, or a failure in a device. For example, faults may include software bugs, faulty software design, faulty codes in software, hardware bugs, faulty hardware design, faulty hardware components/materials, deviations from device specifications, standards, expectations, and/or requirements, and/or other faults.

Fault information may include information on the identity, features, characteristics, nature, quality, and/or quantity of a fault of a device. For example, the fault information may include a description of a fault. A description of a fault may include free-form textual description of the fault. Free-form textual description of a fault may refer to text that describes the fault, with the text written/recorded without conforming to any particular structure or shape of information. That is, rather than describing the fault using predetermined keywords or categories of faults, the fault information may describe the fault using description entered by an entity, such as a technician that observed the fault.

For example, a fault of a device may have been observed based on physical observations of the device, analysis of the device, monitoring of the device, and/or other information. For instance, a fault of a device may be identified during and/or after the development of the device by an entity (person, organization), and a description of the fault may be recorded by the entity. The description of the fault may include free-form textual description of the fault, such as free-form textual description entered by a technician. The free-form textual description of the fault may identify the fault, identify aspects/features of the device affected by the fault, identify potential causes and/or remedial actions for the fault, and/or include other information regarding the fault.

In various embodiments, the cluster engine 116 may be configured to cluster the fault into a fault type based on the fault information. A fault type may refer to a category of faults having one or more common characteristics. A fault type may refer to a particular type of fault. A fault type may include a particular fault or multiple faults of the same type. The cluster engine 116 may cluster (e.g., group, collect, assemble) the fault into a fault type based on information provided within and/or information determined based on the fault information. For example, the cluster engine 116 may identify one or more characteristics of the fault within the fault information and match the identified fault characteristic(s) with a particular fault type. As another example, the cluster engine 116 may determine one or more characteristics of the fault based on information within the fault information and match the determined fault characteristic(s) with a particular fault type. The cluster engine 116 may cluster the fault into an existing fault type. For instance, information within the fault information may indicate that the fault is of a fault type that is already existing, and the cluster engine 116 may cluster the fault into the existing fault type. The cluster engine 116 may cluster the fault into a new fault type. For instance, information within the fault information may not match any existing fault type, and the cluster engine 116 may generate a new fault type and associate or label the fault with the new fault type.

In some embodiments, the fault information may include description of the fault and the cluster engine 116 may cluster the fault into a fault type based on the description of the fault. For instance, the fault information may include free-form textual description of the fault and the cluster engine 116 may cluster the fault into a fault type based on the free-form textual description of the fault. Use of free-form textual description of the fault to cluster the fault into a fault type may provide for more accurate clustering of the fault than manual clustering of faults into fault types. That is, a fault may be clustered based on manual categorization of a fault type for the fault. For instance, a technician that observes a fault in a device may manually categorize the fault into a particular fault type, which may be associated with a fault type code. However, such categorization of faults into fault types may be prone to error. For example, there may be numerous fault categories into which a fault may be clustered and a technician may inaccurately identify the fault type.

Clustering of the fault into a fault type based on the free-form textual description of the fault may provide more accurate clustering of faults into fault types than manual categorization of faults. The cluster engine 116 may compare the descriptions of different faults to cluster the faults into one or more fault types. For example, the cluster engine 116 may associate one or more words and/or one or more phrases with a fault type and cluster all faults that include the word(s) and/or the phrase(s) with the fault type. The cluster engine 116 may remove one or more words and/or one or more phrases from analysis when clustering faults into fault types. That is, the cluster engine 116 may filter out word(s) and/or phrase(s) from being considered when performing analysis of the free-form textual description of the fault. For instance, the cluster engine 116 may filter out commonly used words from impacting clustering of faults into fault types. The cluster engine 116 may use text mining and/or natural language processing to determine whether certain faults are of the same fault type, regardless of and/or in addition to how the faults may be manually categorized (e.g., by a technician).

The cluster engine 116 may generate rankings, probabilities, and/or scores to identify fault types into which a fault may be clustered. For example, based on analysis of free-form textual description of a fault, the cluster engine 116 may rank different fault types based on order of likely match between the fault and the fault type. The cluster engine 116 may cluster the fault into the highest ranked fault type. As another example, the cluster engine 116 may generate probabilities that a fault is a match for different fault types. The cluster engine 116 may cluster the fault into the fault type with the highest probability. As yet another example, the cluster engine 116 may generate scores that a fault is a match for different fault types. The cluster engine 116 may cluster the fault into the fault type with the highest score. The cluster engine 116 may require one or more threshold criteria to be satisfied before a fault is clustered into a fault type. A threshold criteria may refer to one or more of standards, factors, and/or rules that must be met before a fault is clustered into a fault type. For example, a threshold criteria may require that a probability of match or a match score between a fault and a fault type be higher than a threshold probability or a threshold score before the fault is clustered into the fault type.

In various embodiments, the remedial actions engine 118 may be configured to identify a set of remedial actions taken for the fault type. A set of remedial actions taken for a fault type may refer to one or more remedial actions which have been taken for the fault type. A remedial action may refer to an action intended to remedy, correct, ameliorate, fix and/or otherwise address a fault of the fault type. The remedial actions engine 118 may identify remedial actions taken for faults within the fault type. The remedial actions engine 118 may analyze one or more records relating to the faults within the fault type to discover what remedial actions have been taken for the faults. For example, the datastore 112 may include one or more datasets that identifies remedial actions taken for different faults, and the remedial actions engine 118 may identify the set of remedial actions taken for the fault type by accessing the datasets/portions of the dataset for the faults within the fault type. As another example, the remedial actions engine 118 may access internal or external databases, internal or external applications, and/or other information sources to identify remedial actions taken for the fault type.

The remedial actions identified by the remedial actions engine 118 may or may not be limited by one or more factors. For example, the remedial actions engine 118 may identify remedial actions taken for the fault type for a period of time or for all time. As another example, the remedial actions engine 118 may identify remedial actions taken for the fault type by one or more particular entities or by all entities. As yet another example, the remedial actions engine 118 may identify remedial actions taken for the fault type at one or more geographic location or at all locations.

In various embodiments, the remedial effects engine 120 may be configured to determine a set of remedial effects of the set of remedial actions for the fault type. A set of remedial effects may refer to remedial changes that have been observed following the remedial actions. A remedial change may refer to whether and/or to what extent a remedial action remedied, corrected, ameliorated, fixed and/or otherwise addressed a fault of the fault type. The remedial effects engine 120 may identify remedial effects which have resulted from the remedial actions taken for faults within the fault type. The remedial effects engine 120 may analyze one or more records relating to the faults within the fault type to discover what remedial effects have resulted from the remedial actions. For example, the datastore 112 may include one or more datasets that identifies remedial effects of different remedial actions taken for different faults, and the remedial effects engine 120 may identify the set of remedial effects resulting from one or more remedial actions taken for the fault type by accessing the datasets/portions of the dataset for the remedial actions. As another example, the remedial effects engine 120 may access internal or external databases, internal or external applications, and/or other information sources to identify remedial effects resulting from remedial actions taken for the fault type.

The remedial effects engine 120 may cluster multiple remedial actions into a single remedial action. For example, the remedial effects engine 120 may deduplicate multiple instances of the same remedial actions such that distinct remedial actions for a fault type may be identified. As another example, a set of remedial effects identified by the remedial effects engine 120 may include different listings of the same remedial action. For instance, the same remedial action may have been taken for multiple faults of the same type, but the records of the remedial actions may have been entered differently (e.g., by different technicians) such that the multiple applications of the same remedial actions are recorded as being different remedial actions. The remedial effects engine 120 may group the remedial actions together such that the effects of distinct remedial actions are properly measured.

The remedial effects engine 120 may track remedial actions taken for the fault type to determine effectiveness of the remedial actions, such as whether and/or to what extent different remedial actions remedied, corrected, ameliorated, fixed and/or otherwise address one or more faults of the fault type. For example, the remedial effects engine 120 may review the fault histories of devices that exhibited fault(s) of the fault type to determine whether one or more faults of the same fault type reoccurred at all and/or reoccurred within a certain duration of time. For instance, a fault of a fault type may have been detected for a device and a remedial action may have been taken to address the fault. If the same fault or a fault within the same fault type reoccurs for the device (e.g., within a given time period), the remedial action that was taken for the device may be labeled as having a temporary fix effect. A temporary fix effect of a remedial action may indicate that the remedial action may not provide a permanent solution for the fault. If the same fault or a fault within the same fault type does not reoccur for the device (e.g., within a given time period), the remedial action that was taken for the device may be labeled as having a final fix effect. A final fix effect of a remedial action may indicate that the remedial action may provide a permanent solution for the fault.

In various embodiments, the timeline view engine 122 may be configured to generate a timeline view of the fault type based on the set of remedial actions and the set of remedial effects. The timeline view of the fault type may refer to collection of information in visual form to provide a chronological view of faults of a fault type and/or remedial actions for the fault type. The timeline view of the fault type may include a visual representation of effectiveness of the set of remedial actions. The timeline view may facilitate analysis of history of faults/fault types and remedial actions taken for the faults/fault types. That is, the timeline view may help a user to understand when a fault of a given fault type has occurred before (in a single device or across multiple devices) and to determine how effective prior remedial actions have been—whether they provided a temporary solution or a permanent solution for the fault. The timeline view may be used to determine which remedial action(s) should be taken for a new occurrence of a fault of the fault type, and may be used to improve effectiveness of taking remedial actions.

The timeline view of the fault type may include different visual elements that represent different information relating to faults of the fault type and/or remedial actions for the fault type. For example, the timeline view of the fault type may include a first set of visual elements representing occurrences of one or more faults of the fault type and a second set of visual elements representing a set of remedial actions taken for the fault(s) of the fault type. The second set of visual elements, representing remedial action(s) taken for the fault(s), may change based on the effectiveness of the set of remedial actions. That is, one or more visual characteristics of the second set of visual elements, such as shape, size, and/or color, may change to indicate how effective the corresponding remedial action was in remedying, correcting, ameliorating, fixing and/or otherwise addressing the fault(s). For example, the remedial effects of remedial actions may be grouped into a temporary fix effect (e.g., same and/or similar fault occurs within thirty days of applying the remedial action) and a final fix effect (e.g., same and/or similar fault does not occur within thirty days of applying the remedial action), and the visual characteristic(s) of the second set of visual elements may change to indicate whether the corresponding remedial action provided a temporary fix effect or a final fix effect.

The timeline view of the fault type may be used to identify chronic faults. That is, the timeline view of the fault type may be used to identify those faults that regularly occurs for a device or devices of the same type. The timeline view of the fault type may be used to determine if and/or how different remedial actions and/or different combinations of remedial actions resolved the fault. For example, the timeline view of the fault type may indicate that faults of a particular fault type are seen regularly in a particular type of device. The timeline view of the fault type may provide visual representations of the occurrences of faults and the effectiveness of the different remedial actions taken for the faults. The visual representations may be used to identify which remedial action and/or which combination of remedial actions provided a final fix effect for the faults of the fault type.

In various embodiments, the interface engine 124 may be configured to provide one or more interfaces through which the timeline view of the fault type is accessible. Other information relating to faults, fault types, remedial actions, remedial effects, timeline view of the fault type, and/or devices may be accessible through the interface(s) provided by the interface engine 124. For example, information that may be accessible through the interface(s) may include information on identity, features, characteristics, nature, quality, and/or quantity of fault(s) of a device/device type, information on properties of the device/device type, and/or information on remedial actions taken for fault types. The interface(s) may enable filtering of information displayed within the timeline view and/or other views. For example, the interface(s) may enable a user to see a history of certain faults/fault types using filtering. For instance, a view presented by the interface(s) may include visual representations of all faults recorded for a device/device type, and the interface(s) may enable a user to remove one or more faults from view using filtering.

The interface(s) provided by the interface engine 124 may include application programming interface(s) and/or user interface(s) through which information is accessible. For example, the interface engine 124 may provide one or more APIs that may be used by users/computing devices to view, use, and/or manipulate information relating to faults, fault types, remedial actions, remedial effects, timeline view, and/or devices. As another example, the interface engine 124 may provide one or more user interfaces (e.g., web user interface) through which users/computing devices may enter/select/provide commands to view, use, and/or manipulate information relating to faults, fault types, remedial actions, remedial effects, timeline view, and/or devices.

Figure 2:
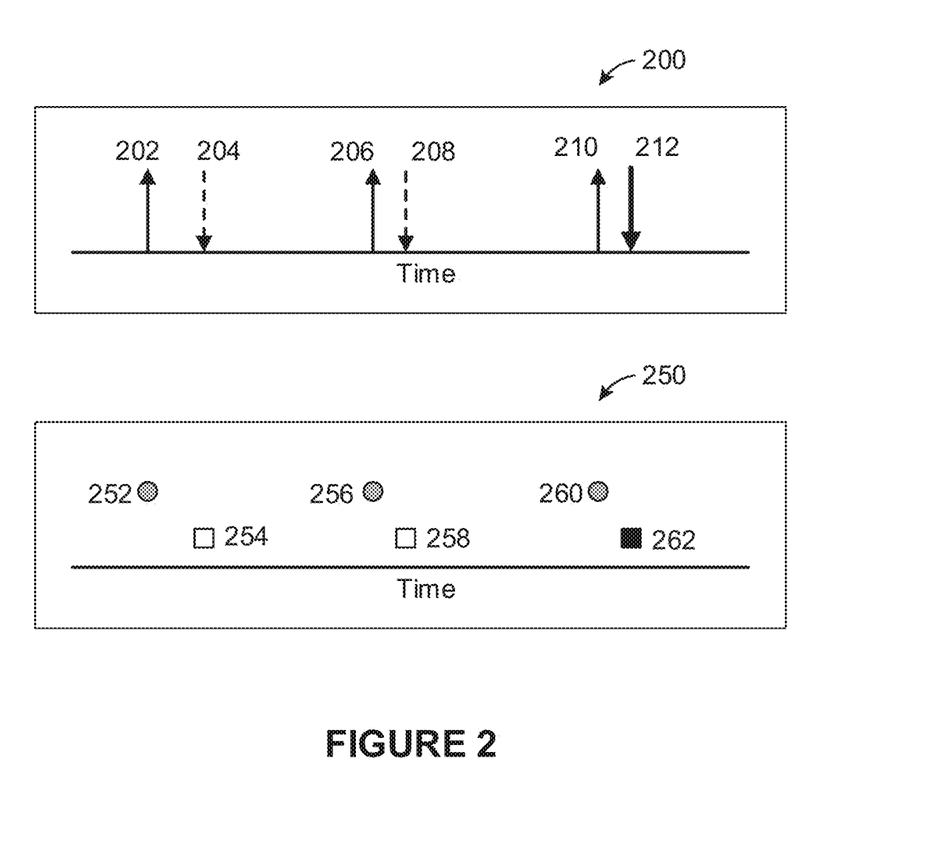
FIG. 2 illustrates example timeline views of a fault type, in accordance with various embodiments.

FIG. 2 illustrates example timeline views 200, 250, in accordance with various embodiments. The timeline views 200, 250 may visually provide information relating to a fault type. For example, the timeline views 200, 250 may provide a chronological view of faults of a fault type and/or remedial actions for the fault type. The timeline views 200, 250 may include different visual elements representing different information relating to faults of the fault type and/or remedial actions for the fault type. For example, the timeline view 200 may include visual elements 202, 206, 210 representing occurrences of faults of the fault type and visual elements 204, 208, 212 representing remedial actions taken for the faults represented by the visual elements 202, 206, 210. The timeline view 250 may include visual elements 252, 256, 260 representing occurrences of faults of the fault type and visual elements 254, 258, 262 representing remedial actions taken for the faults represented by the visual elements 252, 256, 260. Other appearances of the visual elements representing occurrences of faults and remedial actions taken for faults are contemplated.

The visual elements 204, 208, 212, 254, 258, 262 representing remedial actions may change based on the effectiveness of the corresponding remedial actions. That is, one or more visual characteristics of the visual elements 204, 208, 212, 254, 258, 262, such as shape, size, and/or color, may change to indicate how effective the corresponding remedial action was in remedying, correcting, ameliorating, fixing and/or otherwise addressing the faults. For example, the remedial effects of remedial actions may be grouped into a temporary fix effect (e.g., same and/or similar fault occurs within thirty days of applying the remedial action) and a final fix effect (e.g., same and/or similar fault does not occur within thirty days of applying the remedial action), and the visual characteristic(s) of the visual elements 204, 208, 212, 254, 258, 262 may change to indicate whether the corresponding remedial action provided a temporary fix effect or a final fix effect.

For example, referring to the timeline view 200, the dotted arrows of the visual elements 204, 208 may indicate that the corresponding remedial actions provided a temporary fix for the fault while the solid arrow of the visual element 212 may indicate that the corresponding remedial action provided a final fix effect. Referring to the timeline view 250, the empty/unshaded boxes of the visual elements 254, 258 may indicate that the corresponding remedial actions provided a temporary fix for the fault while the filled/blackened box of the visual element 262 may indicate that the corresponding remedial action provided a final fix effect. Thus, the visual characteristics of the visual elements 204, 208, 212, 254, 258, 262 may visually represent the effectiveness of the corresponding remedial actions.

The visual elements 204, 208, 212, 254, 258, 262 representing remedial actions may change based on the type and/or identity of the remedial actions. For example, application of different remedial actions to address faults may be indicated by different visual characteristics of the visual elements 204, 208, 212, 254, 258, 262, such as shape, size, and/or color. Visually distinguishing different remedial actions by the appearances of the visual elements 204, 208, 212, 254, 258, 262 may enable users to identify whether and how different remedial actions provide different remedial effects.

The timeline views 200, 250 may facilitate analysis of history of faults/fault types and remedial actions taken for the faults/fault types. That is, the timeline views 200, 250 may help a user to understand when a fault of a given fault type has occurred before (in a single device or across multiple devices) and to determine how effective prior remedial actions have been. For example, the timeline views 200, 250 may help a user to understand whether different remedial actions provided a temporary solution or a permanent solution for the fault.

For example, the timeline views 200, 250 may show that three faults of a given fault type have been recorded. The three faults may have been recorded for a single device or multiple devices of the same type. That is, the timeline views 200, 250 may provide a history of faults for a single device or a history of faults for multiple devices of the same type. The timeline views 200, 250 may show that faults of the same type are regularly occurring for a single device or multiple devices of the same type. That is, the single device or devices of the same type may be experiencing chronic faults.

The temporal relationship of occurrences of events represented by the visual elements 202, 204, 206, 208, 210, 212, 252, 254, 256, 258, 260, 262 may be indicated by where in the timeline views 200, 250 the visual elements 202, 204, 206, 208, 210, 212, 252, 254, 256, 258, 260, 262 are located. The timeline within the timeline views 200, 250 may be an absolute timeline or a relative timeline. An absolute timeline may show when events occurred with respect to fixed time. For example, the timeline view 200 may show when different events for a device occurred within a given time period. A relative timeline may show when events occurred with respect to relative time. For example, the timeline view 200 may show when faults of the same fault type occurred for three devices with respect to device operation. For instance, the visual elements 202, 206, 210 may represent occurrences of the same fault for three different devices of the same type, with the visual element placed in the timeline view with respect to when individual devices started operation.

The timeline views 200, 250 may be used to determine which remedial action(s) should be taken for a new occurrence of a fault of the fault type, and may be used to improve effectiveness of taking remedial actions. The timeline views 200, 250 may be used to determine if and/or how different remedial actions and/or different combinations of remedial actions resolved the fault. For example, the timeline view 200 may show (via the visual elements 202, 206, 210) that the same fault or faults of the same type occurred for a single device at three separate times. The visual elements 204, 208, 212 may represent three different remedial actions were taken for the faults. The timeline view 200 may show that the first two remedial actions did not provide a permanent fix for the fault while the last remedial action provided a permanent fix for the fault. Alternatively, the visual elements 204, 212 may represent the same remedial action (remedial action A) and the visual element 208 may represent another remedial action (remedial action B) taken for the faults. The timeline view 200 may show that application of the remedial action A or the remedial action B did not provide a permanent fix for the fault. The timeline view 200 may show that application of the remedial action B followed by the remedial action A provided a permanent fix for the fault. Thus, the timeline views 200, 250 may be used to identify which remedial action and/or which combination of remedial actions provided a permanent fix for the faults of a fault type.

Figure 3:
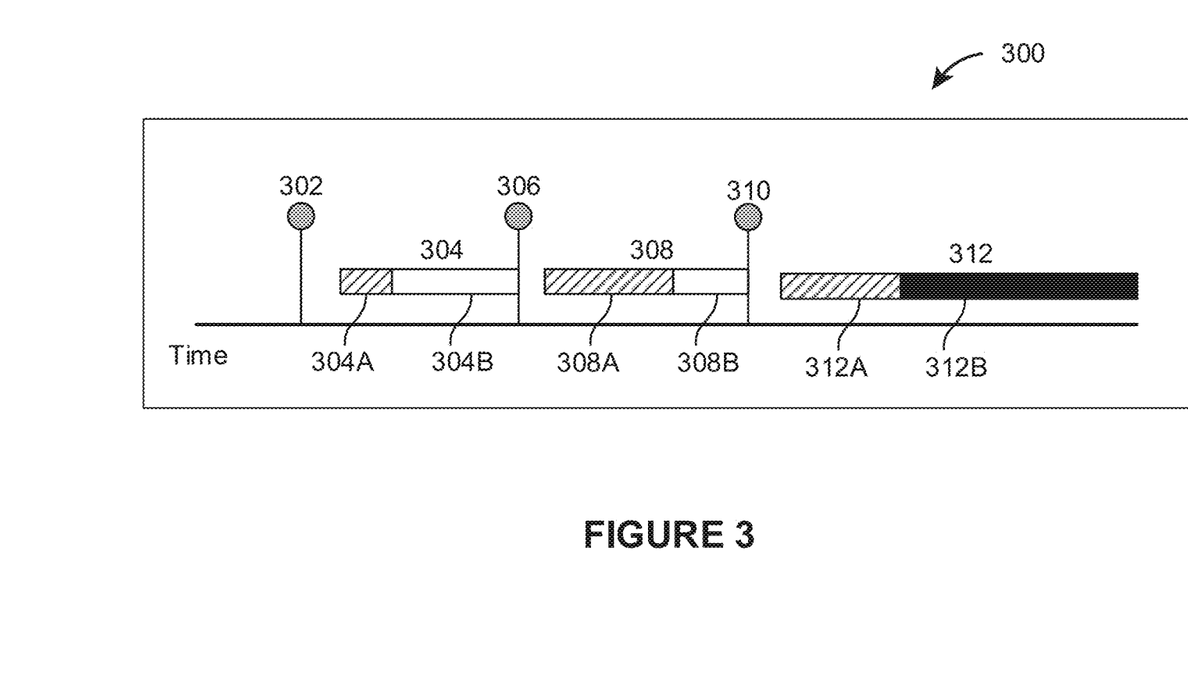
FIG. 3 illustrates an example timeline view of a fault type, in accordance with various embodiments.

FIG. 3 illustrates an example timeline view 300 of a fault type, in accordance with various embodiments. The timeline view 300 may visually provide information relating to a fault type. For example, the timeline view 300 may provide a chronological view of faults of a fault type and/or remedial actions for the fault type. The timeline view 300 may include different visual elements representing different information relating to faults of the fault type and/or remedial actions for the fault type. For example, the timeline view 300 may include visual elements 302, 306, 310 representing occurrences of faults of the fault type and visual elements 304, 308, 312 representing remedial actions taken for the faults represented by the visual elements 302, 306, 310. Other appearances of the visual elements representing occurrences of faults and remedial actions taken for faults are contemplated.

The visual elements 304, 308, 312 representing remedial actions may visually provide information relating to the corresponding remedial actions. For example, portions 304A, 308A, 312A of the visual elements 304, 308, 312 may indicate the amount of time required to take the corresponding remedial action. The portions 304B, 308B, 312B of the visual elements 304, 308, 312 may indicate the amount of time for which the corresponding remedial action was effective. For example, the portion 304B may indicate the amount of time between completion of the corresponding remedial action and the reoccurrence of a fault of the fault type (indicated by the visual element 308). The portion 312B may be presented differently from the portions 304B, 308B to indicate that the remedial effect of the remedial action corresponding to the visual element 312 included a final fix effect while the remedial effect of the remedial actions corresponding to the visual elements 304, 308 included a temporary fix effect.

Figure 4:
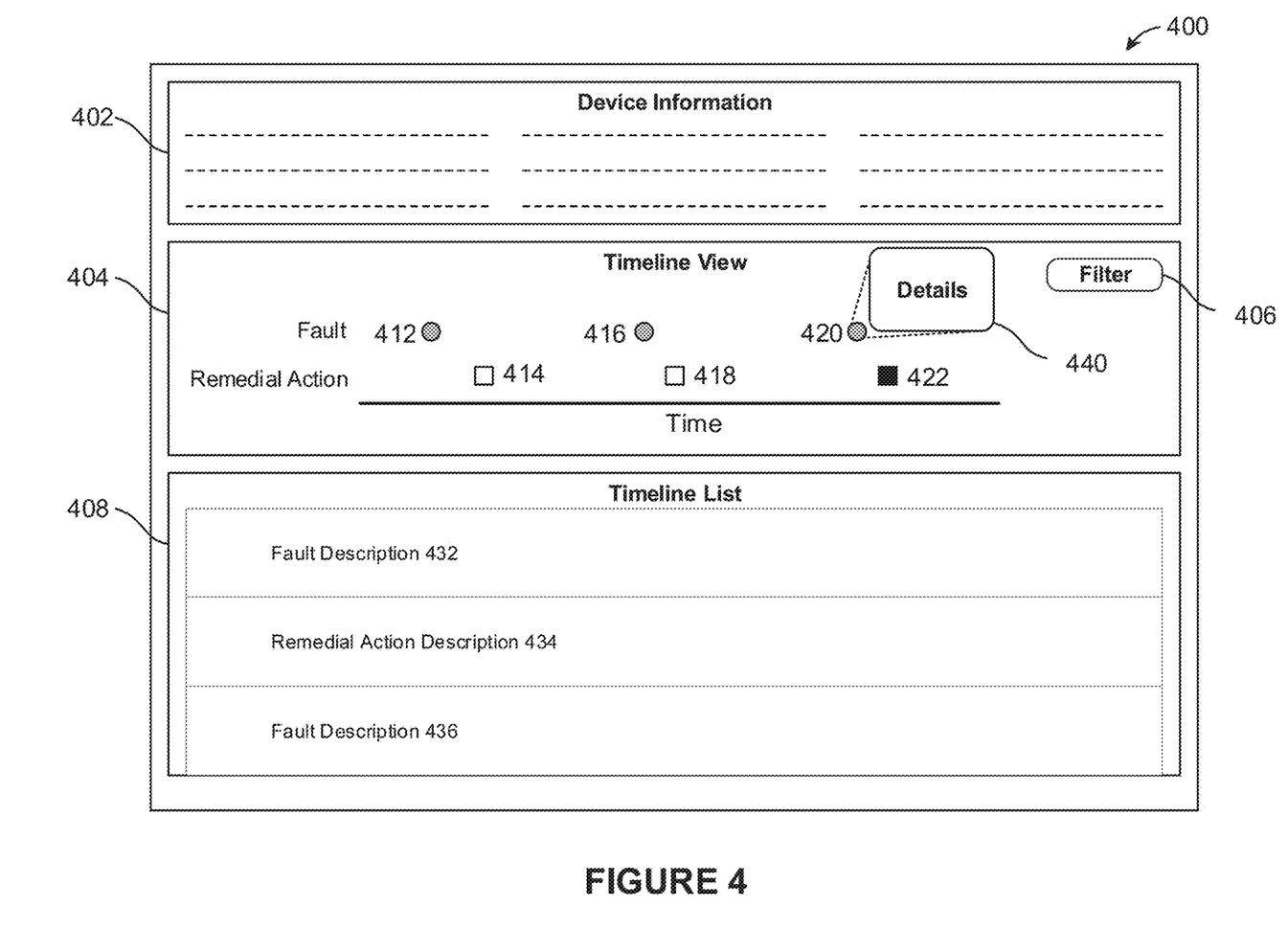
FIG. 4 illustrates example user interface for providing improved analysis of remedial actions for faults, in accordance with various embodiments.

FIG. 4 illustrates an example user interface 400 for providing improved analysis of remedial actions for faults, in accordance with various embodiments. In various embodiments, the user interface 400 may be accessed through a software application running on a computing device (e.g., computers, mobile phones, tablets, etc.) that includes one or more processors and memory. For example, the user interface 400 may be accessible through a web browser. In another example, the user interface 400 may be provided through a data analysis application. In yet another example, the user interface 400 may be provided as a service over a network (e.g., software as a service). Other uses of the user interface 400 are contemplated. Depending on the computing device, the user may be able to interact with the user interface 400 using various input devices (e.g., keyboard, mouse, etc.) and/or touch gestures. The user interface 400 is provided merely as an example and, naturally, the arrangement and configuration of such user interface can vary depending on the implementation. Thus, depending on the implementation, the user interface 400 may include additional features and/or alternative features.

The user interface 400 may include a device information section 402, a timeline view section 404, and a timeline list section 408. The device information section 402 may include information relating to a device or a device type. For example, the device information section 402 may include information relating to properties of a single device or multiple devices of a single device type. The device information section 402 may provide information relating to faults of the device/device type, such as chronic faults recorded for the device/device type, the components of the device/device type affected by the chronic faults, and/or other information relating to the faults of the device/device type. Other information may be included within the device information section 402.

The timeline view section 404 may include a timeline view of a fault type. For example, the timeline view section 404 may include a timeline view of a fault type that includes visual elements 412, 416, 420 representing occurrences of one or more faults of the fault type and visual elements 414, 418, 422 representing remedial actions taken for the fault(s) of the fault type.

The timeline view and/or the timeline view section 404 may provide information on classification of faults, fault types, and/or remedial actions taken for fault types. For example, the timeline view and/or the timeline view section 404 may classify faults based on fault types, severity of faults, locations of faults, durations of faults, and/or other characteristics faults. As another example, the timeline view and/or the timeline view section 404 may classify fault types severity of fault types, locations of fault types, durations of fault types, and/or other characteristics fault types. As yet another example, the timeline view and/or the timeline view section 404 may classify remedial actions based on effectiveness (e.g., temporary fix effect, final fix effect) and/or based on the types of remedial actions.

The timeline view and/or the timeline view section 404 may provide information on frequency of fault, fault type, and/or remedial actions. For example, the timeline view and/or the timeline view section 404 may provide information on how many times particular faults have been recorded (e.g., within a period of time or duration of the records), how many times particular fault types have been recorded (e.g., within a period of time or duration of the records), and/or how many times particular remedial actions have been taken (e.g., within a period of time or duration of the records).

The timeline view and/or the timeline view section 404 may provide information on success rate and/or effective duration of remedial actions. For example, the timeline view and/or the timeline view section 404 may provide information on the percentage of times application of particular remedial actions have been successful (e.g., in providing final fix, in providing temporary fix for a threshold duration). As another example, the timeline view and/or the timeline view section 404 may provide information on durations of time needed to take the remedial actions and/or duration of time for which the remedial actions were effective (e.g., duration of time between competition of the remedial action and reoccurrence of the fault).

The information provided by the user interface 400 may enable a user to decide how to address an occurrence of a fault. The user may use the history of faults and remedial actions presented within the timeline view to determine what remedial action(s) may provide a temporary fix and what remedial action(s) may provide a final fix to a fault. The user may use the timing information provided by the user interface 400 to select a remedial action. For example, a user may select among potential remedial actions based on the amount of time available to take a remedial action, the amounts of time required to take different remedial actions, the amounts of time for which the different remedial actions are effective, and/or the amount of time for which the fault must be addressed. For instance, if a device needs to be in operation right away but may be down in a short time, a remedial action that takes a short amount of time to be applied and/or provides a temporary fix effect may be taken, and another remedial action that takes longer amount of time to be applied and/or provides a final fix effect may be scheduled for a later time. The information on the faults and/or the remedial actions may also be used to automate the selection and/or scheduling of remedial actions for a device. For example, the selection and/or application of remedial actions to address one or more faults may be automated based on the probability of success of the remedial actions, timing of the remedial actions (e.g., time to be applied, effectiveness duration), resources (e.g., time, personnel, equipment, parts) available to take the remedial actions, and/or other information relating to the faults and/or remedial actions.

Some or all of the visual elements 412, 414, 416, 418, 420, 422 may be interactive. That is, a user may interact with some of all of the visual elements 412, 414, 416, 418, 420, 422 to cause a change in the information presented by the user interface 400. For example, responsive to user interaction with one of the visual elements 412, 416, 420, information on the corresponding fault may be presented. For instance, responsive to user interaction with the visual element 420, information on the fault represented by the visual element 420 may be presented within the timeline view section 404 (e.g., information relating to the fault may be displayed within the details box 440 that appears near to the visual element 420) and/or the timeline list section 408 (e.g., the fault description corresponding to the fault represented by the visual element 420 may be shown and/or highlighted within the timeline list section 408).

As another example, responsive to user interaction with one of the visual elements 414, 418, 422, information on the corresponding remedial action may be presented. For instance, responsive to user interaction with the visual element 422, information on the remedial action represented by the visual element 422 may be presented within the timeline view section 404 (e.g., information relating to the fault may be displayed within a details box that appears near the visual element 422) and/or the timeline list section 408 (e.g., the remedial action description corresponding to the remedial represented by the visual element 422 may be shown and/or highlighted within the timeline list section 408).

Other parts of the user interface 400 and/or the timeline view section 404 may be interactive. For example, the line representing time within the timeline view section 404 may be interactive such that a user may engage with the line (e.g., drag the line) to change the duration of time, as well as faults and remedial actions, represented within the timeline view.

Presentation of the information on the corresponding fault or the corresponding remedial action may include a preview of a view of the information within an external application. An external application may refer to an external separate from the application presenting the user interface 400. The external application may be a native application that uses the information to be provided within the preview. For example, information on a fault represented by the visual element 420 may include a sensor data indicating the occurrence of the fault and/or sensor data recorded during the occurring of the fault. An external application may use the sensor data to provide a visualization of the sensor data, such as a graph of sensor values included within the sensor data. The details box 440 may include a preview of the graph of sensor values without launching the external application. Other previews of information are contemplated.

Presentation of information on the corresponding fault or the corresponding remedial action may include one or more links to records for the fault or the remedial action. A link may refer to a reference to data (e.g., hyperlink) that may be followed by interacting (e.g., clicking, tapping, hovering) with the link. For example, the details box 440 for the fault represented by the visual element 420 may include a link to a record created for the occurrence of the fault. Such a record may include textual description of the fault and/or media (e.g., image file(s), video file(s), audio file(s), sensor file(s)) relating to the fault. As another example, information presented for the remedial action represented by the visual element 422 may include a link to a record created for the remedial action. Such a record may include textual description of the remedial action and/or media relating to the remedial action.

The user interface 400 may include a filter option 406. The activation of the filter option 406 may prompt a user to enter one or more criteria by which faults and/or remedial action represented in the timeline view section 404 may be filtered. For example, the timeline view section 404 may display all faults or particular faults of a device/device type based on filtering of information using the filter option 406. The user may use the filter option 406 to remove one or more faults and/or remedial actions from being represented by visual element in the timeline view section 404.

The timeline list section 408 may include information relating to faults of a device or a device type. For example, the timeline list section 408 may list faults recorded for a device or a device type, remedial actions taken for the faults, and/or other information relating to faults of a device or the device type. The information provided within the timeline list section 408 may be tied to the information provided within the timeline view section 404. For example, the fault description 432 may include information that provide description of the fault represented by the visual element 412, the remedial action description 434 may include information that provide description of the remedial action represented by the visual element 414, and the fault description 436 may include information that provide description of the fault represented by the visual element 416. A user may interact with (e.g., scroll down) the timeline list section 408 to view information relating to other faults and/or remedial actions. The descriptions of faults and/or remedial actions provided in the timeline list section 408 may include one or more links to records for the corresponding faults and/or remedial actions. For example, the fault description 432 may include a link to a record created for the occurrence of the corresponding fault. Such a record may include textual description of the fault and/or media (e.g., image file(s), video file(s), audio file(s), sensor file(s)) relating to the fault. As another example, the remedial action description 434 may include a link to a record created for the corresponding remedial action. Such a record may include textual description of the remedial action and/or media relating to the remedial action.

Figure 5:
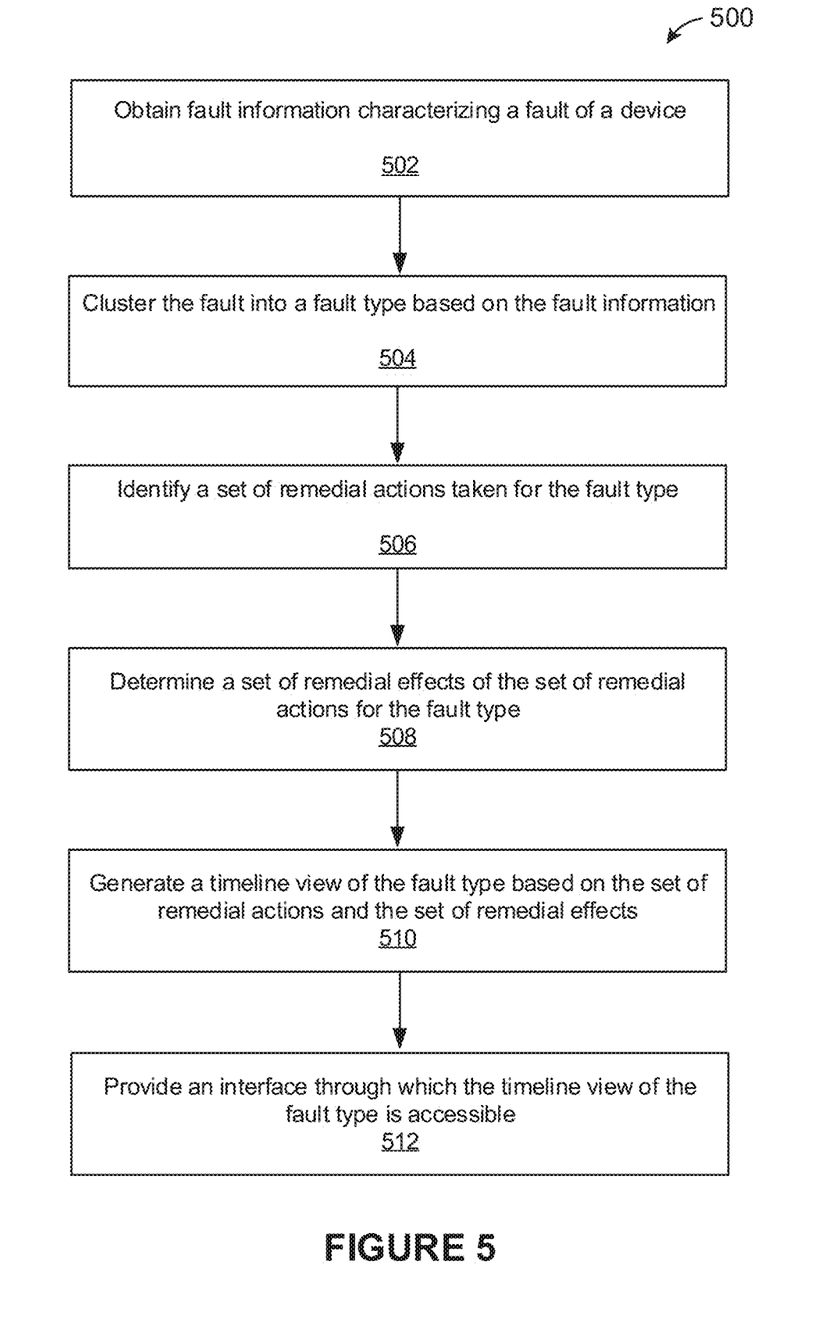
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, fault information may be obtained. The fault information may characterize a fault of a device. At block 504, the fault may be clustered into a fault type based on the fault information. At block 506, a set of remedial actions taken for the fault type may be identified. At block 508, a set of remedial effects of the set of remedial actions for the fault type may be determined. At block 510, a timeline view of the fault type may be generated based on the set of remedial actions and the set of remedial effects. The timeline view may include a visual representation of effectiveness of the set of remedial actions. At block 512, an interface, through which the timeline view of the fault type is accessible, may be provided.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
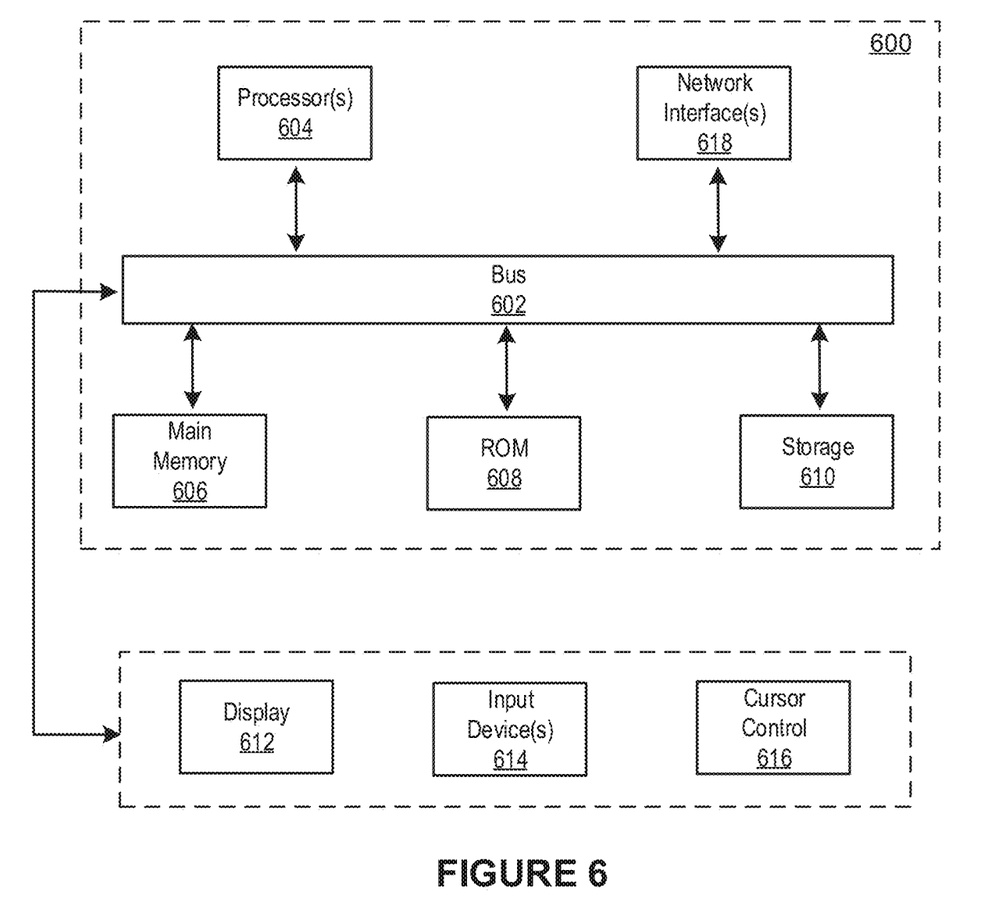
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a stand-alone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:
1. A system comprising:
one or more processors; and
a memory storing instructions that, when executed by the one or more processors, cause the system to perform:
obtaining fault information, the fault information characterizing a fault of a device;
clustering the fault into a fault type based on the fault information, the clustering comprising:
generating probabilities that the fault matches with respective fault types;
clustering the fault into a fault type having a highest probability; and in response to the fault information not matching an existing fault type, generating a new fault type and clustering the fault into the new fault type;
identifying a set of remedial actions associated with the fault type;
determining a set of remedial effects of the set of remedial actions for the fault type, wherein the set of remedial effects indicate whether one or more faults of the fault type reoccurred at a specific duration of time following the set of remedial actions;
receiving a selection of a remedial action based on a remedial effect corresponding to the remedial action; and
automatically applying, by the one or more processors, the selected remedial action to resolve the fault of the device.

2. The system of claim 1, wherein the instructions further cause the system to perform:
determining whether the fault is a chronic fault occurring in the device or a device type corresponding to the device based on a frequency of occurrence of the fault.

3. The system of claim 2, wherein the instructions further cause the system to perform:
identifying a particular component of the device or the device type affected by the chronic fault.

4. The system of claim 1, wherein the set of remedial effects includes:
an indication of whether the remedial actions provided a final fix or a temporary fix, determined based on whether one or more faults of the fault type reoccurred within a specific duration of time; and
a percentage of times that the remedial actions provided a final fix or a temporary fix.

5. The system of claim 1, wherein the instructions further cause the system to perform:
presenting a video or audio media file relating to the fault.

6. The system of claim 5, wherein the clustering the fault into the fault type having a highest probability is in response to the highest probability satisfying a threshold probability.

7. The system of claim 6, wherein, in response to the highest probability not satisfying a threshold probability, the system determines that the fault information does not match an existing fault type.

8. A method implemented by a computing system including one or more processors and storage media storing machine-readable instructions, wherein the method is performed using the one or more processors, the method comprising:
obtaining fault information, the fault information characterizing a fault of a device;
clustering the fault into a fault type based on the fault information, the clustering comprising:
generating probabilities that the fault matches with respective fault types;
clustering the fault into a fault type having a highest probability; and
in response to the fault information not matching an existing fault type, generating a new fault type and clustering the fault into the new fault type;
identifying a set of remedial actions associated with the fault type;
determining a set of remedial effects of the set of remedial actions for the fault type, wherein the set of remedial effects indicate whether one or more faults of the fault type reoccurred at a specific duration of time following the set of remedial actions;
receiving a selection of a remedial action based on a remedial effect corresponding to the remedial action; and
automatically applying, by the one or more processors, the selected remedial action to resolve the fault of the device.

9. The method of claim 8, further comprising:
determining whether the fault is a chronic fault occurring in the device or a device type corresponding to the device based on a frequency of occurrence of the fault.

10. The method of claim 9, further comprising:
identifying a particular component of the device or the device type affected by the chronic fault.

11. The method of claim 8, wherein the set of remedial effects includes:
an indication of whether the remedial actions provided a final fix or a temporary fix, determined based on whether one or more faults of the fault type reoccurred within a specific duration of time; and
a percentage of times that the remedial actions provided a final fix or a temporary fix.

12. The method of claim 8, further comprising:
presenting a video or audio media file relating to the fault.

13. The method of claim 12, wherein the clustering the fault into the fault type having a highest probability is in response to the highest probability satisfying a threshold probability.

14. The method of claim 13, further comprising:
in response to the highest probability not satisfying a threshold probability, determining that the fault information does not match an existing fault type.

15. A non-transitory computer readable medium comprising instructions that, when executed, cause one or more processors to perform:
obtaining fault information, the fault information characterizing a fault of a device;
clustering the fault into a fault type based on the fault information, the clustering comprising:
generating probabilities that the fault matches with respective fault types;
clustering the fault into a fault type having a highest probability;
in response to the fault information not matching an existing fault type, generating a new fault type and clustering the fault into the new fault type;
identifying a set of remedial actions associated with the fault type; and
determining a set of remedial effects of the set of remedial actions for the fault type, wherein the set of remedial effects indicate whether one or more faults of the fault type reoccurred at a specific duration of time following the set of remedial actions;
receiving a selection of a remedial action based on a remedial effect corresponding to the remedial action; and
automatically applying, by the one or more processors, the selected remedial action to resolve the fault of the device.

* * * * *